(12) United States Patent
Sasabayashi et al.

(10) Patent No.: US 11,373,805 B2
(45) Date of Patent: Jun. 28, 2022

(54) MULTILAYER CERAMIC CAPACITOR

(71) Applicant: Murata Manufacturing Co., Ltd., Nagaokakyo (JP)

(72) Inventors: Takehisa Sasabayashi, Nagaokakyo (JP); Yasuyuki Shimada, Nagaokakyo (JP); Naoto Muranishi, Nagaokakyo (JP); Shinichi Kokawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/188,108

(22) Filed: Mar. 1, 2021

(65) Prior Publication Data

US 2021/0287853 A1 Sep. 16, 2021

(30) Foreign Application Priority Data

Mar. 16, 2020 (JP) .............................. JP2020-045014

(51) Int. Cl.
*H01G 4/30* (2006.01)
*H01G 4/12* (2006.01)
*H01G 4/008* (2006.01)
*H01G 4/012* (2006.01)

(52) U.S. Cl.
CPC ........... *H01G 4/1227* (2013.01); *H01G 4/008* (2013.01); *H01G 4/012* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 7,295,422 B2 | 11/2007 | Ito et al. | |
| 8,087,136 B2 | 1/2012 | Ito et al. | |
| 9,064,636 B1* | 6/2015 | Sugita | H01G 4/12 |
| 2006/0043523 A1 | 3/2006 | Ito et al. | |
| 2008/0110006 A1 | 5/2008 | Ito et al. | |
| 2009/0219666 A1* | 9/2009 | Fukuda | C04B 35/62805 |
| | | | 501/137 |
| 2013/0286541 A1 | 10/2013 | Kawamoto | |
| 2017/0018363 A1* | 1/2017 | Tanaka | H01G 4/30 |
| 2020/0066446 A1* | 2/2020 | Fukunaga | H01G 4/0085 |
| 2020/0105468 A1* | 4/2020 | Hashimoto | H01G 4/30 |
| 2020/0111613 A1* | 4/2020 | Teraoka | H01G 4/30 |
| 2021/0210285 A1* | 7/2021 | Sasabayashi | H01G 4/1227 |
| 2021/0287853 A1* | 9/2021 | Sasabayashi | H01G 4/0085 |

FOREIGN PATENT DOCUMENTS

JP 2006073623 A 3/2006

* cited by examiner

*Primary Examiner* — Dion R. Ferguson
(74) *Attorney, Agent, or Firm* — ArentFox Schiff LLP

(57) ABSTRACT

An Mn/Ti peak intensity ratio in a dielectric ceramic layer in an end surface outer layer portion is within two times to fifteen times of the Mn/Ti peak intensity ratio in a central portion, a rare earth element/Ti peak intensity ratio in the dielectric ceramic layer in the end surface outer layer portion is within two times to seven times the rare earth element/Ti peak intensity ratio in the central portion, an Si/Ti peak intensity ratio in the dielectric ceramic layer in a side surface outer layer portion is within two times to five times the Si/Ti peak intensity ratio in the central portion, and the rare earth element/Ti peak intensity ratio in the dielectric ceramic layer in the side surface outer layer portion is within two times to seven times the rare earth element/Ti peak intensity ratio.

9 Claims, 11 Drawing Sheets

MULTILAYER CERAMIC CAPACITOR

CROSS REFERENCE TO RELATED APPLICATIONS

The present application claims priority to Japanese Patent Application No. 2020-045014, filed Mar. 16, 2020, the entire contents of which are incorporated herein by reference.

BACKGROUND OF THE INVENTION

Field of the Invention

The present invention relates to a ceramic capacitor and specifically to a multilayer ceramic capacitor structured such that a plurality of dielectric ceramic layers and a plurality of internal electrode layers are layered.

Description of the Background Art

A multilayer ceramic capacitor structured such that an external electrode is disposed on opposing end surfaces of a multilayer body including layered dielectric ceramic layers and internal electrode layers to conduct to the internal electrode layers has conventionally widely been used.

Japanese Patent Laid-Open No. 2006-73623 describes a multilayer ceramic capacitor structured as such, the multilayer ceramic capacitor including an element main body in which dielectric ceramic layers and internal electrode layers are alternately layered, at least one of the dielectric ceramic layer and the internal electrode layer having a different phase formed therein, the different phase containing an Mg element and an Mn element.

According to Japanese Patent Laid-Open No. 2006-73623, with the construction described above, a multilayer ceramic capacitor low in IR temperature dependency and excellent in average lifetime characteristics can be realized.

In the structure of the multilayer ceramic capacitor described in Japanese Patent Laid-Open No. 2006-73623, however, the internal electrode layer is smaller in two-dimensional area than the dielectric ceramic layer, and there is a height difference between a peripheral portion of the internal electrode layer and the dielectric ceramic layer except for a portion where the internal electrode layer is drawn to an end surface of the element main body. Under the influence of the height difference, the internal electrode layer tends to be bent, which leads to tendency of short-circuiting between the internal electrode layers or lowering in high-temperature load reliability.

In particular, as the dielectric ceramic layer is smaller in thickness and as the number of layered internal electrode layers and dielectric ceramic layers is larger, short-circuiting between internal electrode layers is more likely and reliability tends to lower.

Then, a ceramic green sheet with no height difference between a region where an internal electrode pattern to be an internal electrode layer after firing is formed and a region where no internal electrode pattern is formed (which is also referred to as a "zero-height-difference sheet" below) is layered to manufacture a multilayer ceramic capacitor.

For example, a method of forming a multilayer body has been known, in which a ceramic green sheet with no height difference between a region where an internal electrode pattern to be an internal electrode layer after firing is formed and a region where no internal electrode pattern is formed is formed by applying a conductive paste to a prescribed region on a ceramic green sheet to form the internal electrode pattern to be the internal electrode layer and thereafter applying a ceramic paste to the region where no internal electrode paste is formed to form a ceramic layer for eliminating the height difference, and such ceramic green sheets are layered.

In this case again, however, under the influence of a small gap between the internal electrode pattern and the ceramic green sheet for eliminating the height difference, a bent portion is formed in the internal electrode layer in the fired multilayer body, which may lead to occurrence of fracture or chipping of the multilayer body or lowering in high-temperature load reliability.

Therefore, under the circumstances, measures for suppressing and preventing occurrence of defects as described above are desirably taken for the multilayer ceramic capacitor.

SUMMARY OF THE INVENTION

A primary object of the present invention is to provide a multilayer ceramic capacitor that solves the problem above, the multilayer ceramic capacitor being less likely to suffer from fracture or chipping and high in high-temperature load reliability.

In order to solve the problem, a multilayer ceramic capacitor according to the present invention includes:

a multilayer body including a plurality of dielectric ceramic layers and a plurality of internal electrode layers that are alternately layered, the plurality of dielectric ceramic layers containing Ba, Ti, Mn, a rare earth element, and Si, the multilayer body defining: a first main surface and a second main surface opposed to each other in a direction of layering of the plurality of dielectric ceramic layers and the plurality of internal electrode layers, a first side surface and a second side surface opposed to each other in a width direction, the width direction being a direction orthogonal to both of the direction of layering and a direction of drawing of the plurality of internal electrode layers to a surface of the multilayer body, and a first end surface and a second end surface opposed to each other in a length direction, the length direction being a direction orthogonal to both of the direction of layering and the width direction;

a first external electrode on the first end surface and electrically connected to a first set of internal electrode layers of the plurality of internal electrode layers; and a second external electrode on the second end surface and electrically connected to a second set of internal electrode layers of the plurality of internal electrode layers, wherein a region where the internal electrode layers are layered on one another when viewed in the direction of layering is defined as an effective portion, regions between which the effective portion lies in the direction of layering each are a main surface outer layer portion, regions between which the effective portion lies in the width direction each are a side surface outer layer portion, regions between which the effective portion lies in the length direction each are an end surface outer layer portion, a value of an end surface outer layer Mn/Ti peak intensity ratio, which is a ratio of a peak intensity of Mn found by laser ICP to a peak intensity of Ti found by laser ICP in the dielectric ceramic layer in the end surface outer layer portion, is within a range of not lower than two times and not higher than fifteen times as large as a value of a central portion Mn/Ti peak intensity ratio, which is a ratio of a peak intensity of Mn found by laser ICP to a peak intensity of Ti found by laser ICP in the dielectric ceramic layer in a central portion in the width direction, the length direction, and the direction of layering in the effective portion, a value of an end surface outer layer rare earth element/Ti peak intensity ratio, which is a ratio of a peak intensity of a rare earth element found by laser ICP to a peak intensity of Ti found by laser ICP in the dielectric ceramic layer in the end surface outer layer portion is within a range of not lower than two times and not higher than seven times as large as a value of a central portion rare earth element/Ti peak intensity ratio, which is a ratio of a peak intensity of the rare earth element found by laser ICP to the peak intensity of the Ti found by laser ICP in the dielectric ceramic layer in the central portion, a value of a side surface outer layer Si/Ti peak intensity ratio, which is a ratio of a peak intensity of Si found by TEM-EDX to a peak intensity of Ti found by TEM-EDX in the dielectric ceramic layer in the side surface outer layer portion is within a range of not lower than two times and not higher than five times as large as a value of a central portion Si/Ti peak intensity ratio, which is a ratio of a peak intensity of Si found by TEM-EDX to a peak intensity of Ti found by TEM-EDX in the dielectric ceramic layer in the central portion in the effective portion, and a value of a side surface rare earth element/Ti peak intensity ratio, which is a ratio of a peak intensity of the rare earth element found by laser ICP to a peak intensity of Ti found by laser ICP in the dielectric ceramic layer in the side surface outer layer portion is within a range of not lower than two times and not higher than seven times as large as a value of the central portion rare earth element/Ti peak intensity ratio.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

An embodiment of the present invention is shown below and features of the present invention will specifically be described.

Figure 1:
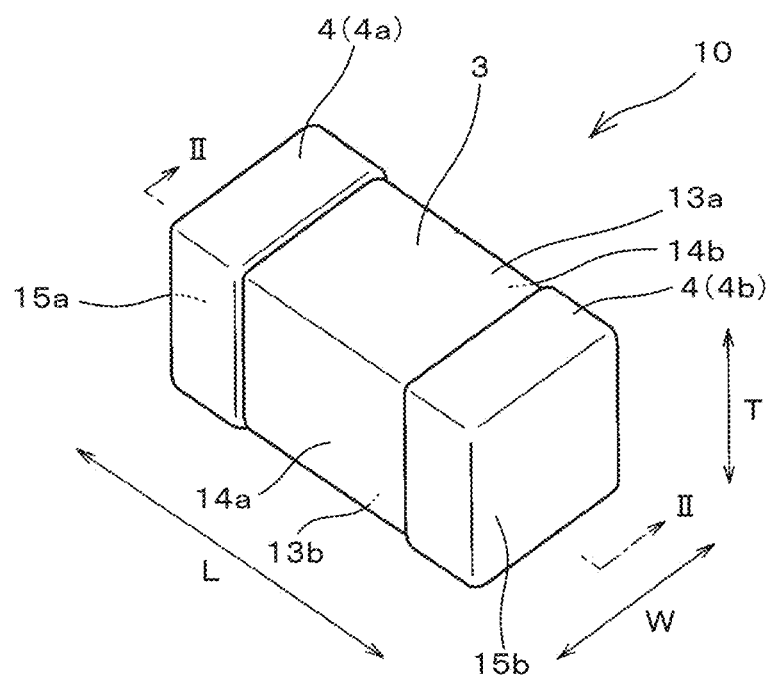
FIG. 1 is a perspective view of a multilayer ceramic capacitor according to one embodiment of the present invention.
Figure 2:
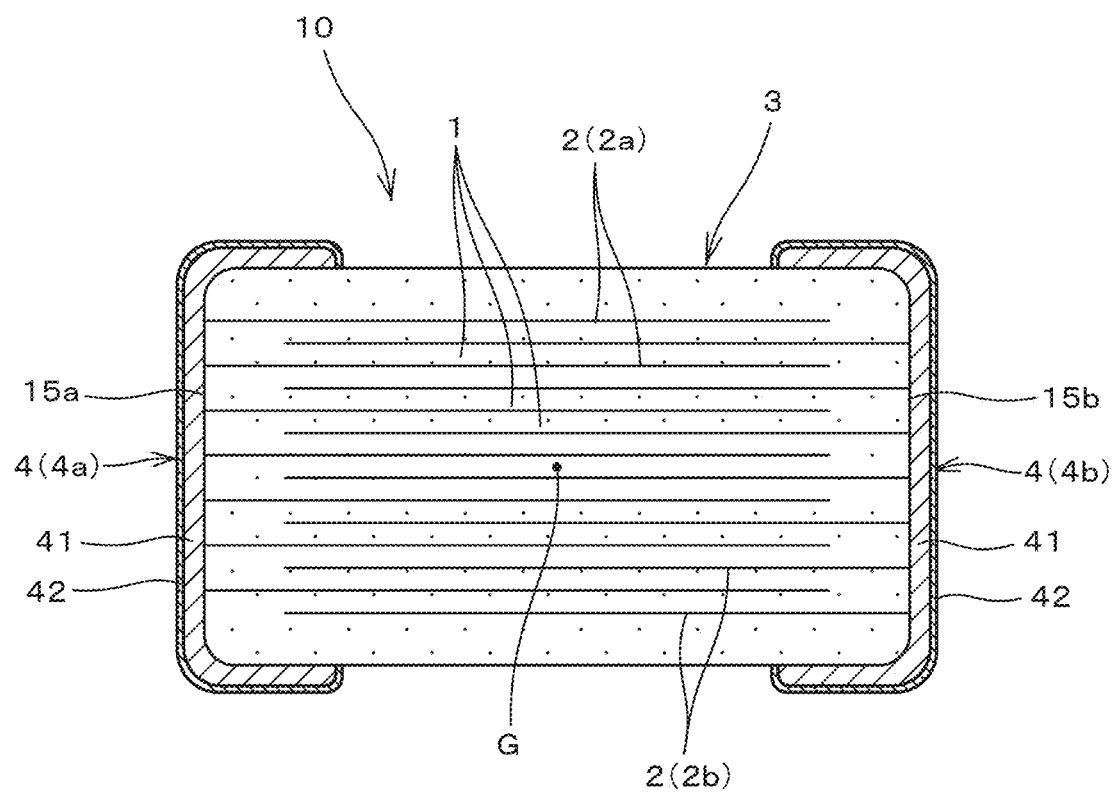
FIG. 2 is a cross-sectional view along the line II-II of the multilayer ceramic capacitor shown in FIG. 1.

FIGS. 1 and 2 are a perspective view and a front cross-sectional view of a multilayer ceramic capacitor according to one embodiment of the present invention, respectively.

As shown in FIGS. 1 and 2, a multilayer ceramic capacitor 10 is generally in a shape of a parallelepiped and includes a multilayer body 3 including a plurality of dielectric ceramic layers 1 and a plurality of internal electrode layers 2 (2a and 2b) that are layered and an external electrode 4 (4a and 4b) disposed to conduct to internal electrode layers 2 at a prescribed position of multilayer body 3.

Multilayer body 3 includes a first main surface 13a and a second main surface 13b opposed to each other in a direction of layering T of dielectric ceramic layers 1 and internal electrode layers 2, a first side surface 14a and a second side surface 14b opposed to each other in a width direction W which is a direction orthogonal to both of layering direction T and a direction of drawing of internal electrode layers 2 to a surface of multilayer body 3, that is, a length direction L below, and a first end surface 15a and a second end surface 15b opposed to each other in length direction L which is a direction orthogonal to both of layering direction T and width direction W.

Internal electrode layer 2 described above includes a first internal electrode layer 2a drawn to first end surface 15a of multilayer body 3 and a second internal electrode layer 2b drawn to second end surface 15b of multilayer body 3.

First external electrode 4a of external electrode 4 is disposed on first end surface 15a to conduct to first internal electrode layers 2a drawn to first end surface 15a and second external electrode 4b is disposed on second end surface 15b to conduct to second internal electrode layers 2b drawn to second end surface 15b.

Specifically, first external electrode 4a is formed on the entire first end surface 15a of multilayer body 3 and formed to extend from first end surface 15a to first main surface 13a, second main surface 13b, first side surface 14a, and second side surface 14b.

Second external electrode 4b is formed on the entire second end surface 15b of multilayer body 3 and formed to extend from second end surface 15b to first main surface 13a, second main surface 13b, first side surface 14a, and second side surface 14b.

Multilayer ceramic capacitor 10 according to the present embodiment has dimensions as below:

a dimension in length direction L of approximately 0.35 mm;

a dimension in width direction W of approximately 0.28 mm;

a dimension in layering direction T of approximately 0.28 mm;

a thickness of the dielectric ceramic layer of approximately 0.5 μm; and a thickness of the internal electrode layer of approximately 0.3 μm.

Multilayer ceramic capacitor 10 according to the present embodiment is manufactured through a step of layering a plurality of ceramic green sheets, each of the ceramic green sheets having an internal electrode pattern to be internal electrode layer 2 after firing disposed thereon.

Figure 6A:
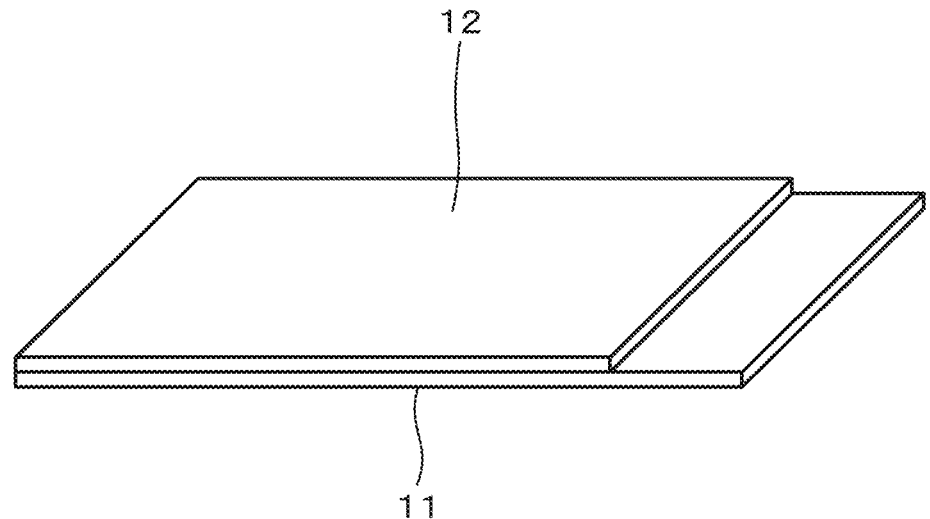
FIG. 6A is a diagram of a state before formation of a ceramic paste layer in a method of making a zero-height-difference sheet used for manufacturing a multilayer ceramic capacitor according to one embodiment of the present invention.
Figure 6B:
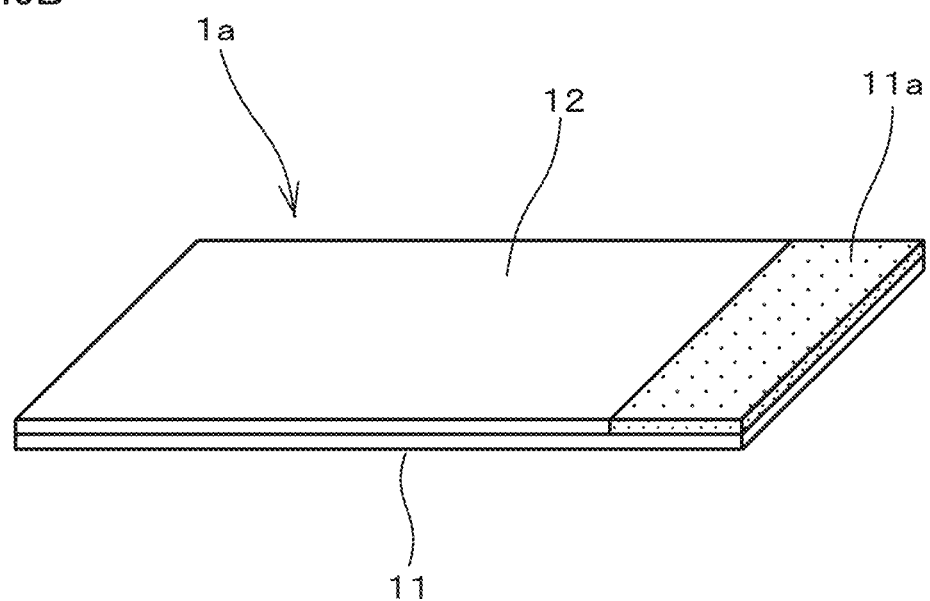
FIG. 6B is a diagram of a state after formation of the ceramic paste layer in the method of making a zero-height-difference sheet used for manufacturing a multilayer ceramic capacitor according to one embodiment of the present invention.

A ceramic green sheet (zero-height-difference sheet) 1a without a height difference between a region where an internal electrode pattern 12 to be internal electrode layer 2 after firing is formed and a region where no internal electrode pattern 12 is formed on a ceramic green sheet 11 is employed as the ceramic green sheet having the internal electrode pattern disposed thereon (see FIG. 6B).

Specifically, in the present embodiment, as shown in FIG. 6A, internal electrode pattern 12 is formed by applying a conductive paste for the internal electrode layer onto ceramic green sheet 11. Thereafter, as shown in FIG. 6B, a ceramic paste layer 11a is formed in a region where no internal electrode pattern 12 is formed. Ceramic green sheet, that is, zero-height-difference sheet, 1a with no height difference between the region where internal electrode pattern 12 is formed and the region where no internal electrode pattern 12 is formed is thus made.

Figure 7:
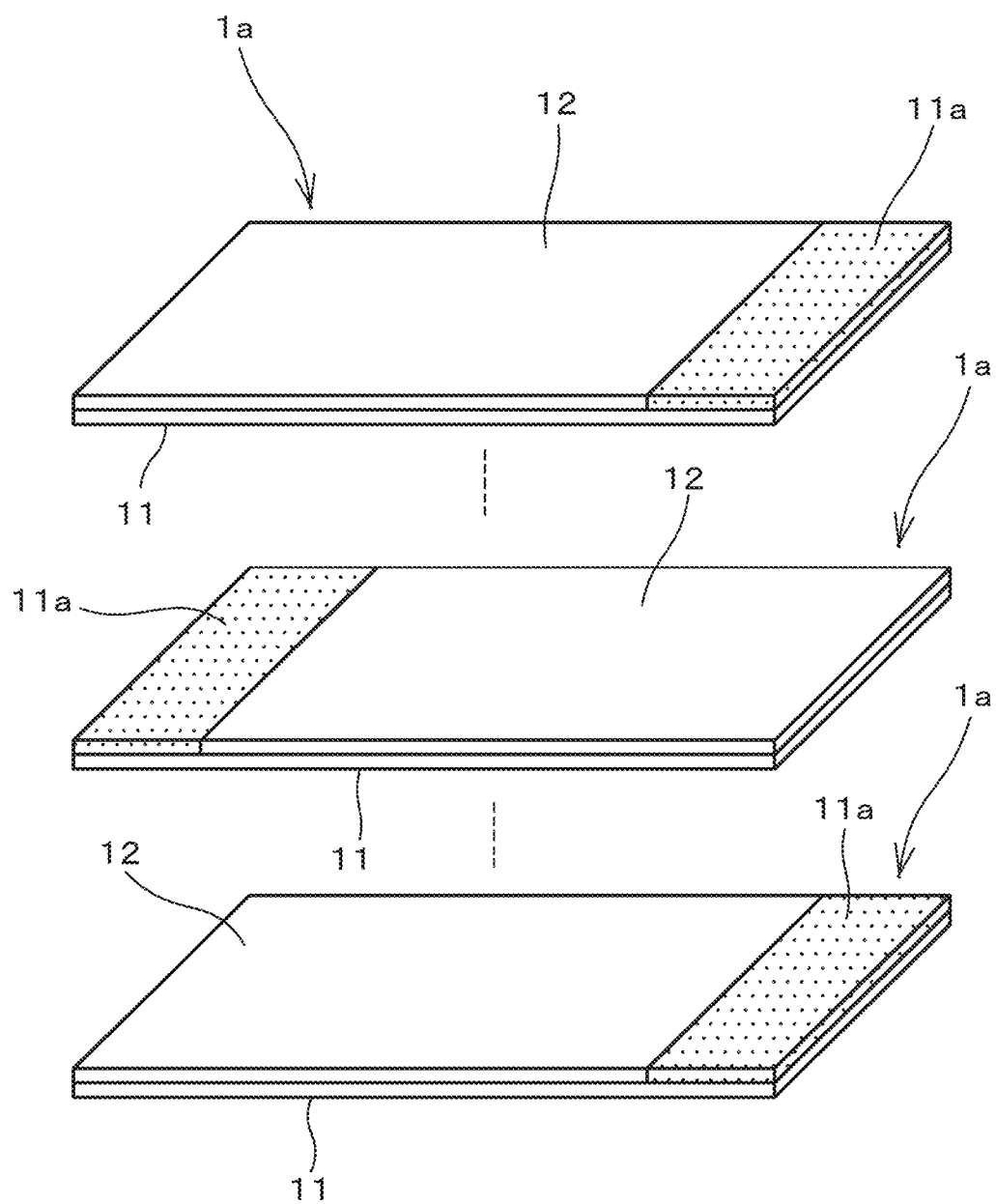
FIG. 7 is a diagram showing one step in a method of manufacturing a multilayer ceramic capacitor according to one embodiment of the present invention.

Then, as shown in FIG. 7, a prescribed number of zero-height-difference sheets 1a are layered in such a manner that internal electrode patterns 12 to be the internal electrode layers after firing are alternately drawn to opposite sides.

Figure 8:
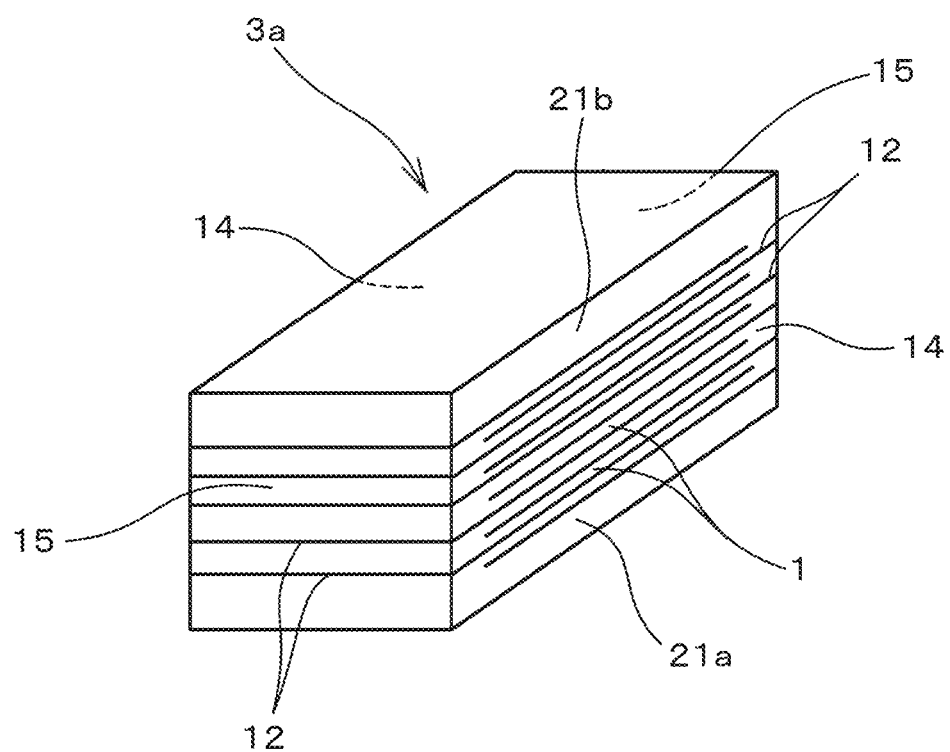
FIG. 8 is a diagram showing another step in the method of manufacturing a multilayer ceramic capacitor according to one embodiment of the present invention.

In forming the multilayer body, specifically, a prescribed number of ceramic green sheets 21a each having no internal electrode pattern formed thereon that form a lower main surface outer layer portion are layered, thereafter a prescribed number of above-described zero-height-difference sheets 1a each having internal electrode pattern 12 formed thereon are layered, and furthermore, a prescribed number of ceramic green sheets 21b each having no internal electrode pattern formed thereon that form an upper main surface outer layer portion are layered, and the sheets are pressure-bonded. Then, an unfired multilayer body 3a structured such that internal electrode patterns 12 are alternately drawn to opposing end surfaces 15 and internal electrode patterns 12 are exposed also at opposing side surfaces 14 is made as shown in FIG. 8.

Figure 9:
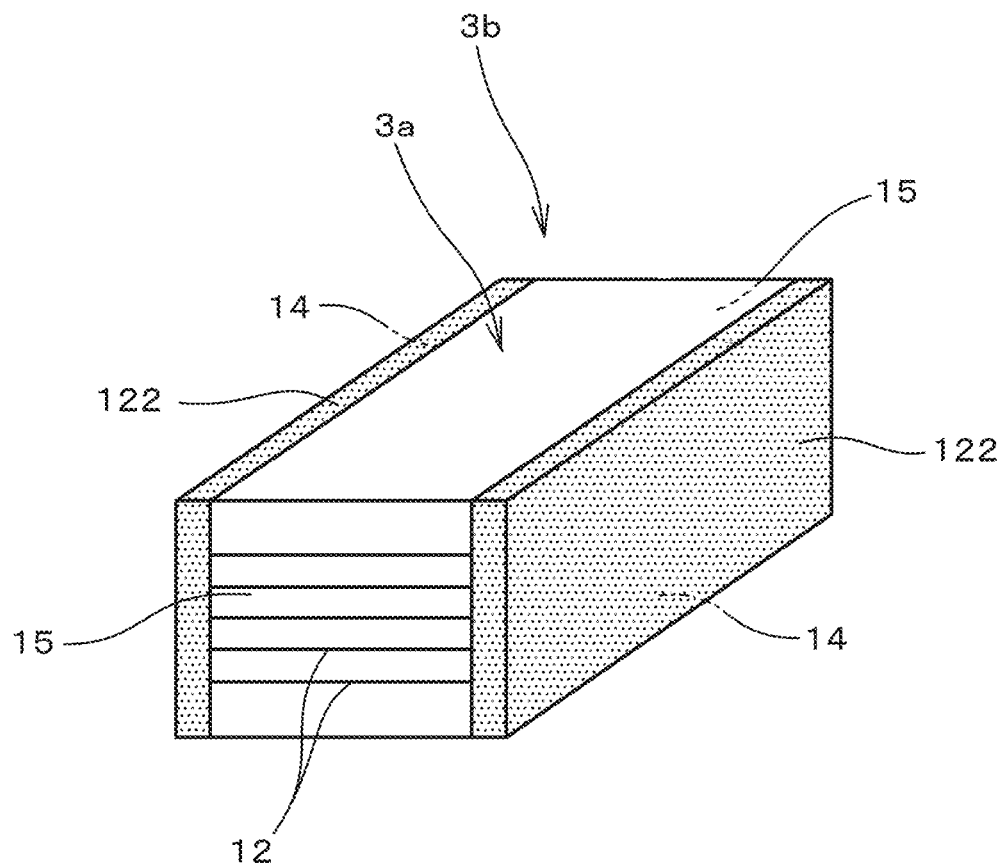
FIG. 9 is a diagram showing another step in the method of manufacturing a multilayer ceramic capacitor according to one embodiment of the present invention.

Then, as shown in FIG. 9, a ceramic green sheet 122 is bonded to opposing side surfaces 14 (FIG. 8) of unfired multilayer body 3a where internal electrode patterns 12 are exposed, to thereby obtain an unfired covered multilayer body 3b in which side surfaces 14 (FIG. 8) where internal electrode patterns 12 are exposed are covered with ceramic green sheets 122.

Then, unfired covered multilayer body 3b is fired to obtain fired multilayer body 3. Thereafter, multilayer ceramic capacitor 10 is obtained by forming first external electrode 4a on first end surface 15a of multilayer body 3 and forming second external electrode 4b on second end surface 15b to conduct to internal electrode layers 2 (2a and 2b) exposed at first end surface 15a and second end surface 15b of multilayer body 3 as shown in FIGS. 1 and 2.

Though a method of forming a single multilayer body 3 is described in the present embodiment, multilayer bodies can be manufactured, for example, by what is called a multi-production method, for example, of forming a mother multilayer body and dividing the mother multilayer body into individual multilayer bodies as will be described below.

Initially, a mother multilayer body is formed by layering in a prescribed manner, a prescribed number of mother green sheets for a lower outer layer portion each having no internal electrode pattern formed thereon, a prescribed number of mother green sheets each having a mother internal electrode pattern like a belt to be internal electrodes for a plurality of multilayer bodies formed thereon, and a prescribed number of mother green sheets for an upper outer layer portion each having no internal electrode pattern formed thereon.

Then, the mother multilayer body is divided at prescribed positions to make unfired multilayer bodies 3a in such a structure that internal electrode patterns 12 are alternately drawn to opposing end surfaces 15 and internal electrode patterns 12 are exposed also at opposing side surfaces 14 as shown in FIG. 8.

Then, as shown in FIG. 9, individual multilayer ceramic capacitors are made by bonding ceramic green sheet 122 on each of opposing side surfaces 14 of unfired multilayer body 3a, firing the multilayer body, and thereafter forming the external electrode.

In this method, in dividing the mother multilayer body at prescribed positions, the mother internal electrode pattern like the belt described above is cut at a plurality of prescribed positions in a direction orthogonal to a longitudinal direction. Thus, as shown in FIG. 8, individual unfired multilayer bodies 3a where internal electrode patterns 12 are exposed also at the side surfaces are formed.

The multilayer ceramic capacitors are generally manufactured by such a multi-production method, and the multilayer ceramic capacitors according to the present invention can also efficiently be manufactured by this multi-production method.

Figure 3:
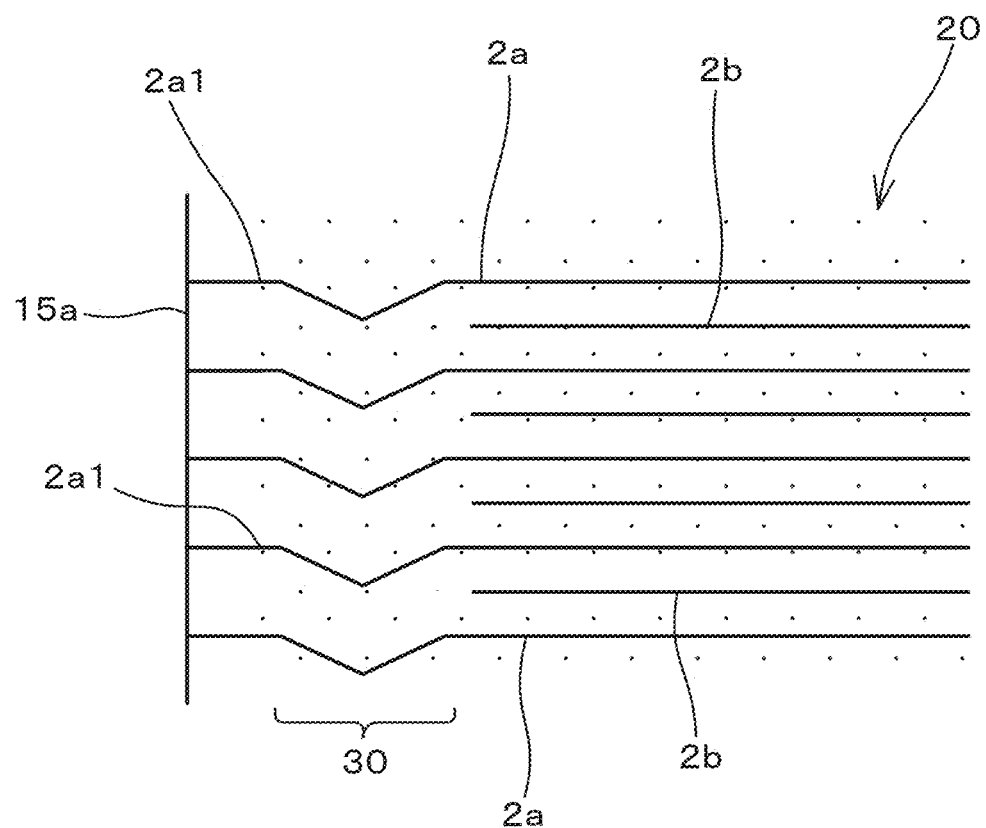
FIG. 3 is a diagram schematically showing a form of an internal electrode layer of the multilayer ceramic capacitor according to one embodiment of the present invention.

In multilayer ceramic capacitor 10 according to the present embodiment, multilayer body 3 is formed from ceramic green sheet (zero-height-difference sheet) 1a with no height difference between the region where internal electrode pattern 12 to be internal electrode layer 2 after firing is formed and the region where no internal electrode pattern 12 is formed on ceramic green sheet 11 as described above. As schematically shown in FIG. 3, however, a bent portion 30 is formed at a drawn portion 2a1 of first internal electrode layer 2a drawn to first end surface 15a. Though reasons therefor are not necessarily clear, it is estimated that bent portion 30 as described above is formed in a pressure bonding step due to strain originating from a gap provided between internal electrode pattern 12 in FIG. 6B and ceramic paste layer 11a for eliminating a height difference between the region where internal electrode pattern 12 is formed and the region where no internal electrode pattern is formed therearound. Bent portion 30 is a factor for fracture and chipping or lowering in high-temperature load reliability in a conventional multilayer ceramic capacitor without features of the present invention which will be described later.

In multilayer ceramic capacitor 10 according to the present embodiment, dielectric ceramic layer 1 in an effective portion 20 which is a region where internal electrode layers 2 are layered on one another when viewed in layering direction T is composed of a ceramic material containing Ba, Ti, Mn, a rare earth element, and Si. More specifically, dielectric ceramic layer 1 is composed of a ceramic material mainly composed of $BaTiO_3$, containing Si, Mn, containing holmium (Ho) as a rare earth element, and further containing V and Zr as trace elements.

Though holmium (Ho) is employed as a rare earth element in the present embodiment, another rare earth element such as dysprosium (Dy), yttrium (Y), or lanthanoid other than holmium (Ho) can also be employed alone or in combination. In the present invention, holmium (Ho), dysprosium (Dy), and yttrium (Y) are particularly preferably employed as a rare earth element.

Internal electrode layer 2, that is, first internal electrode layer 2a and second internal electrode layer 2b, is formed of a metal such as Ni, Cu, Ni, Ag, Pd, Ti, Cr, and Au or an alloy of these metals. Internal electrode layer 2 may contain as a common material, a dielectric composition such as dielectric ceramic particles identical or similar in composition to ceramics contained in dielectric ceramic layer 1.

In multilayer ceramic capacitor 10 according to the present embodiment, external electrode 4, that is, first external electrode 4a and second external electrode 4b, includes a first Ni layer 41 which is an underlying electrode layer and a second Ni layer 42 which is a plated layer formed on first Ni layer 41.

First Ni layer 41 that forms external electrode 4 is formed, for example, by applying a conductive paste containing glass and mainly composed of Ni as a conductive component and baking the conductive paste.

Second Ni layer 42 that forms external electrode 4 is formed by plating a surface of first Ni layer 41 which is the underlying electrode layer with Ni.

External electrode 4 includes first Ni layer 41 which is a baked electrode as an underlying electrode and includes on a surface thereof, second Ni layer 42 which is the plated layer. Thus, a highly reliable multilayer ceramic capacitor including an external electrode which is high in strength of joint to multilayer body 3, has a dense surface, and is excellent in resistance to moisture can be obtained.

Baking of a conductive paste in forming first Ni layer 41 may be carried out simultaneously with firing of multilayer body 3. Alternatively, after firing of multilayer body 3, a conductive paste may be applied to multilayer body 3 and thereafter the conductive paste may be baked.

First Ni layer 41 which is the underlying electrode layer contains as a common material, at a ratio not lower than 25 area % and not higher than 40 area %, a dielectric composition (dielectric ceramic particles in the present embodiment) identical or similar in composition to dielectric ceramics that forms dielectric ceramic layer 1.

By thus containing at a ratio not lower than 25 area % and not higher than 40 area %, the common material in first Ni layer 41 which is the underlying electrode layer, the external electrode can be closer in such a physical property as a coefficient of expansion to the multilayer body, occurrence of a defect such as a crack can be suppressed, and reliability can be improved. Too high a ratio of the common material, however, may lead to lowering in conductivity. Therefore, the ratio desirably does not exceed 40 area %.

A material for external electrode 4 or a method of forming external electrode 4 is not limited to that in the example described above. The external electrode can be formed of various materials to be used for an electrode with various known methods.

Solderability of external electrode 4 can also be improved by forming an Sn layer or a solder layer on second Ni layer 42, for example, by plating.

Figure 4:
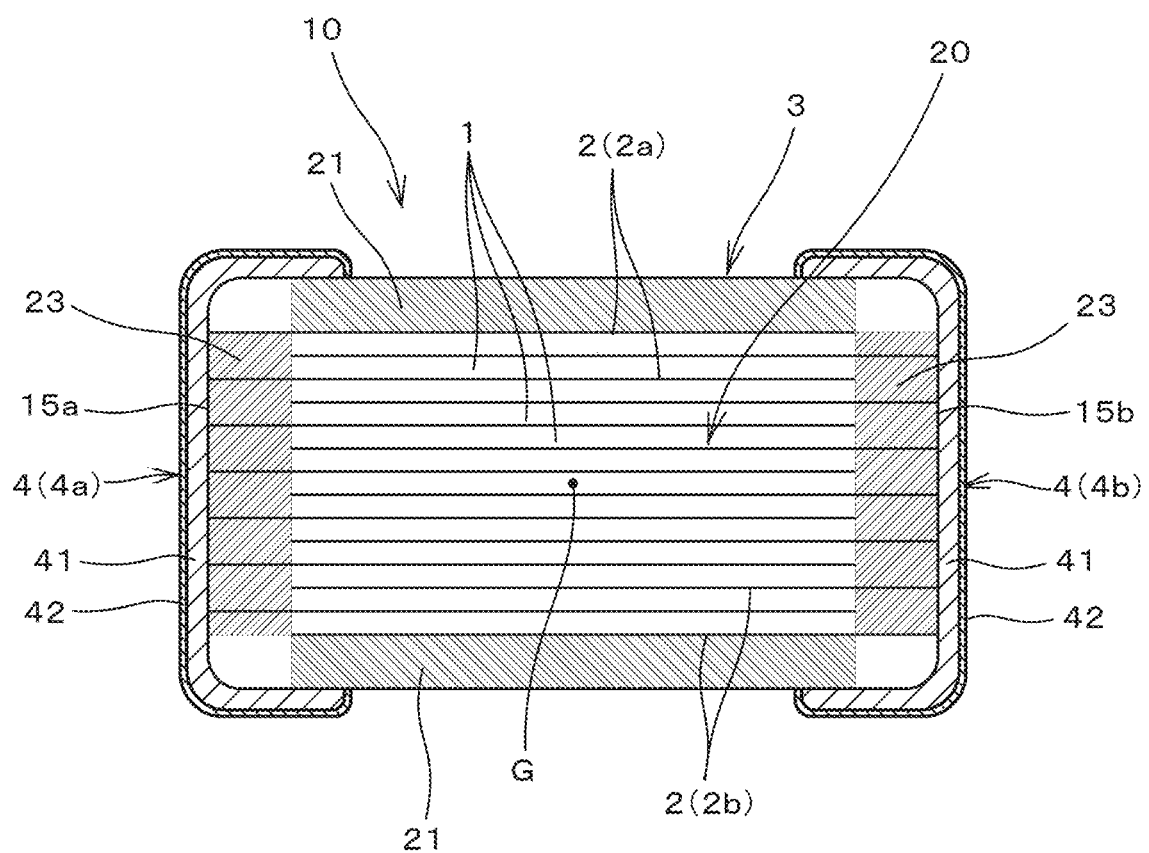
FIG. 4 is a diagram illustrating a position of a main surface outer layer portion and an end surface outer layer portion of the multilayer ceramic capacitor according to one embodiment of the present invention.
Figure 5:
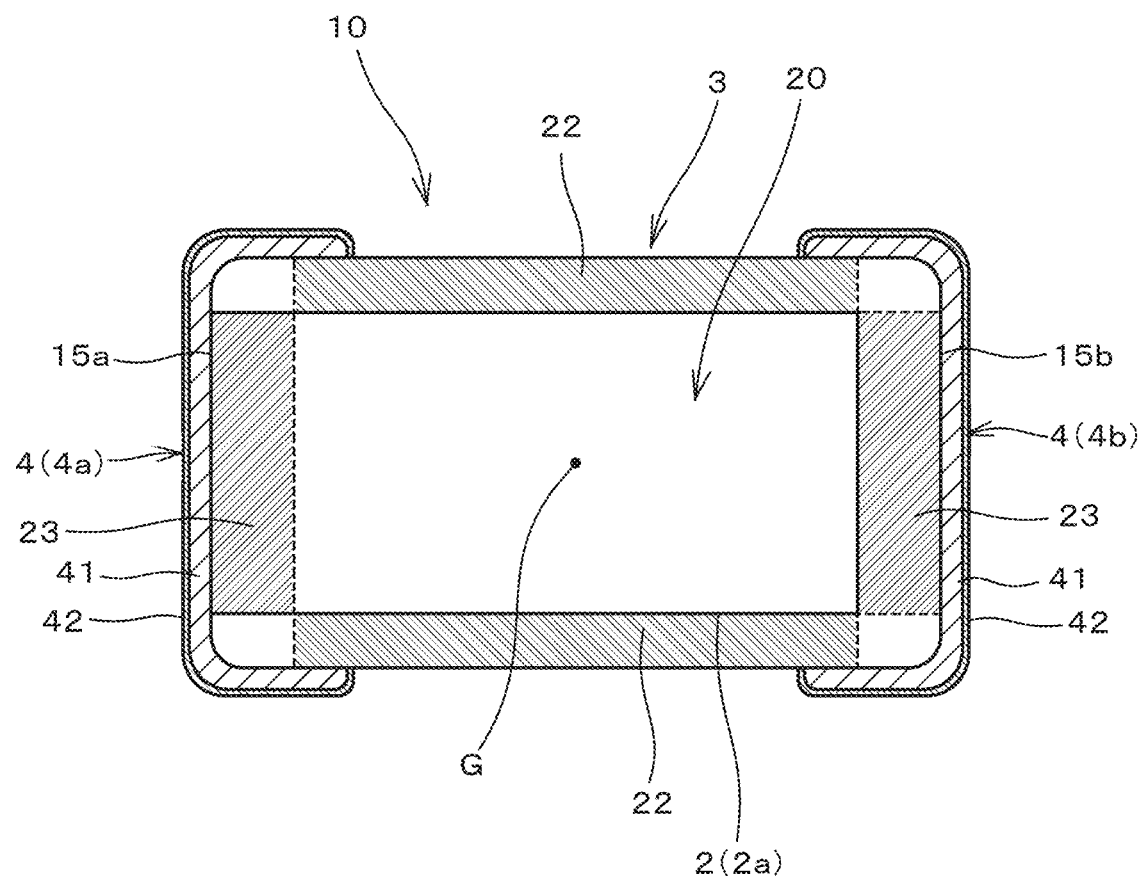
FIG. 5 is a diagram illustrating a position of a side surface outer layer portion and the end surface outer layer portion of the multilayer ceramic capacitor according to one embodiment of the present invention.

In multilayer ceramic capacitor 10 according to the present invention, as shown in FIGS. 4 and 5, when a region where internal electrode layers 2 are layered on one another when viewed in layering direction T is defined as effective portion 20, with regions between which effective portion 20 lies in layering direction T each being defined as a main surface outer layer portion 21, with regions between which effective portion 20 lies in width direction W each being defined as a side surface outer layer portion 22, and with regions between which effective portion 20 lies in length direction L each being defined as an end surface outer layer portion 23, a value of an Mn/Ti peak intensity ratio which is a ratio of peak intensity of Mn found by laser ICP to peak intensity of Ti found by laser ICP in the dielectric ceramic layer in end surface outer layer portion 23 is within a range not lower than two times and not higher than fifteen times as large as a value of the Mn/Ti peak intensity ratio which is a ratio of peak intensity of Mn found by laser ICP to peak intensity of Ti found by laser ICP in the dielectric ceramic layer in a central portion G in width direction W, length direction L, and layering direction T in effective portion 20, and a value of a rare earth element (holmium (Ho) in the present embodiment)/Ti peak intensity ratio which is a ratio of peak intensity of the rare earth element found by laser ICP to peak intensity of Ti found by laser ICP in the dielectric ceramic layer in end surface outer layer portion 23 is within a range not lower than two times and not higher than seven times as large as a value of the rare earth element (holmium (Ho) in the present embodiment)/Ti peak intensity ratio which is the ratio of peak intensity of the rare earth element found by laser ICP to peak intensity of Ti found by laser ICP in the dielectric ceramic layer in central portion G in effective portion 20.

Furthermore, a value of an Si/Ti peak intensity ratio which is a ratio of peak intensity of Si found by TEM-EDX to peak intensity of Ti found by TEM-EDX in the dielectric ceramic layer in side surface outer layer portion 22 is within a range not lower than two times and not higher than five times as large as a value of the Si/Ti peak intensity ratio which is a ratio of peak intensity of Si found by TEM-EDX to peak intensity of Ti found by TEM-EDX in the dielectric ceramic layer in central portion G in effective portion 20, and a value of the rare earth element (holmium (Ho) in the present embodiment)/Ti peak intensity ratio which is the ratio of peak intensity of the rare earth element found by laser ICP to peak intensity of Ti found by laser ICP in the dielectric ceramic layer in side surface outer layer portion 22 is within a range not lower than two times and not higher than seven times as large as a value of the rare earth element/Ti peak intensity ratio which is the ratio of peak intensity of the rare earth element found by laser ICP to peak intensity of Ti found by laser ICP in the dielectric ceramic layer in central portion G in effective portion 20.

For example, a method of filling a gap created at a height difference portion between the internal electrode and the dielectric ceramic layer at an end surface with a ceramic paste, employing as the ceramic paste, a ceramic paste higher in ratio of Mn to Ti and in ratio of a rare earth element to Ti than that for a ceramic green sheet to be the dielectric ceramic layer included in the effective portion, and diffusing Mn and the rare earth element during firing can be applied as a method of setting the value of the Mn/Ti peak intensity ratio or the rare earth element/Ti peak intensity ratio found by laser ICP in the dielectric ceramic layer in end surface outer layer portion 23 to be larger than the value of the Mn/Ti peak intensity ratio or the rare earth element/Ti peak intensity ratio in the dielectric ceramic layer in central portion G in effective portion 20.

For example, a method of employing a ceramic green sheet higher in ratio of Si to Ti or in rare earth element (Ho in the present embodiment) to Ti than a ceramic green sheet to be the dielectric ceramic layer in central portion G in effective portion 20 as a ceramic green sheet to be the dielectric ceramic layer that forms side surface outer layer portion 22 can be applied as a method of setting the Si/Ti peak intensity ratio found by TEM-EDX in the dielectric ceramic layer in side surface outer layer portion 22 to be higher than the Si/Ti peak intensity ratio found by TEM-EDX in the dielectric ceramic layer in central portion G in effective portion 20 or setting the value of the rare earth element (holmium (Ho) in the present embodiment)/Ti peak intensity ratio found by laser ICP in the dielectric ceramic layer in side surface outer layer portion 22 to be larger than the value of the rare earth element/Ti peak intensity ratio found by laser ICP in the dielectric ceramic layer in central portion G in effective portion 20.

Furthermore, for example, a method of applying a paste or powder particles containing Si or a rare earth element at a ratio higher than in a ceramic green sheet to be the dielectric ceramic layer in central portion G in effective portion 20 to an outer side of the ceramic green sheet to be the dielectric ceramic layer that forms side surface outer layer portion 22 while employing the ceramic green sheet the same as the ceramic green sheet that forms main surface outer layer portion 21 as the ceramic green sheet to be the dielectric ceramic layer that forms side surface outer layer portion 22, firmly attaching the paste or the powder particles to a surface of a chip, and diffusing Si or the rare earth element during degreasing and firing can also be applied.

Relation between Si and Ti is defined by a ratio of peak intensity found by TEM-EDX as described above in the present invention, in consideration of the fact that Si is a light element and hence accuracy is low in measurement by laser ICP. Then, peak intensity of Si is examined by TEM-EDX, peak intensity of Ti is also examined by TEM-EDX, and a relation between Si and Ti is defined based on the ratio of peak intensity therebetween (Si/Ti peak intensity ratio) found by TEM-EDX. In other words, in the present invention, the value of the ratio of peak intensity (Si/Ti peak intensity ratio) of Si found by TEM-EDX to peak intensity of Ti found by TEM-EDX in the dielectric ceramic layer in side surface outer layer portion 22 is within the range not lower than two times and not higher than five times as large as the value of the ratio of peak intensity (Si/Ti peak intensity ratio) of Si found by TEM-EDX to peak intensity of Ti found by TEM-EDX in the dielectric ceramic layer in central portion G in effective portion 20.

Relation between Mn and Ti is defined by the Mn/Ti peak intensity ratio found by laser ICP and relation between a rare earth element and titanium is also defined by the rare earth element/Ti peak intensity ratio found by laser ICP.

Table 1 shows the value of the peak intensity ratio in each portion below examined for the multilayer ceramic capacitor in each of Examples 1 to 16 meeting the requirements in the present invention and the multilayer ceramic capacitor in each of Comparative Examples 1 to 15 not meeting the requirements in the present invention that were made in this embodiment.

(1) A value of the Mn/Ti peak intensity ratio which is a ratio of peak intensity of Mn found by laser ICP (laser emission spectrometry) to peak intensity of Ti found by laser ICP in the effective portion and the end surface outer layer portion (2) A value of the Ho/Ti peak intensity ratio which is a ratio of peak intensity of Ho found by laser ICP (laser emission spectrometry) to peak intensity of Ti found by laser ICP in the effective portion, the end surface outer layer portion, and the side surface outer layer portion (3) A value of the Si/Ti peak intensity ratio which is a ratio of peak intensity of Si found by TEM-EDX to peak intensity of Ti found by TEM-EDX in the effective portion and the side surface outer layer portion

TABLE 1

| | Mn/Ti Peak Intensity Ratio | | Ho/Ti Peak Intensity Ratio | | | Si/Ti Peak Intensity Ratio | | | | |
|---|---|---|---|---|---|---|---|---|---|---|
| | Effective Portion | End Surface Outer Layer Portion | Effective Portion | End Surface Outer Layer Portion | Side Surface Outer Layer Portion | Effective Portion | Side Surface Outer Layer Portion | Fracture and Chipping Count N = 100 | MTTF 120° C. 6.3 V | Short-Circuiting Occurrence N = 100 |
| Comparative Example 1 | 1 | 1 | 1 | 1 | 1 | 1 | 1 | 21 | 19 | 0% |
| Comparative Example 2 | 1 | 2 | 1 | 2 | 1 | 1 | 1 | 15 | 36 | 0% |
| Example 1 | 1 | 2 | 1 | 2 | 2 | 1 | 2 | 0 | 36 | 0% |
| Example 2 | 1 | 2 | 1 | 2 | 2 | 1 | 3 | 0 | 33 | 0% |
| Example 3 | 1 | 2 | 1 | 2 | 2 | 1 | 4 | 0 | 35 | 0% |
| Example 4 | 1 | 2 | 1 | 2 | 2 | 1 | 5 | 0 | 40 | 0% |
| Comparative Example 3 | 1 | 2 | 1 | 2 | 2 | 1 | 6 | 0 | 50 | 20% |
| Comparative Example 4 | 1 | 5 | 1 | 5 | 5 | 1 | 1 | 13 | 42 | 0% |
| Example 5 | 1 | 5 | 1 | 5 | 5 | 1 | 2 | 0 | 41 | 0% |
| Example 6 | 1 | 5 | 1 | 5 | 5 | 1 | 3 | 0 | 43 | 0% |
| Example 7 | 1 | 5 | 1 | 5 | 5 | 1 | 4 | 0 | 43 | 0% |
| Example 8 | 1 | 5 | 1 | 5 | 5 | 1 | 5 | 0 | 45 | 0% |
| Comparative Example 5 | 1 | 5 | 1 | 5 | 5 | 1 | 6 | 0 | 42 | 21% |
| Comparative Example 6 | 1 | 10 | 1 | 7 | 7 | 1 | 1 | 10 | 45 | 0% |
| Example 9 | 1 | 10 | 1 | 7 | 7 | 1 | 2 | 0 | 46 | 0% |
| Example 10 | 1 | 10 | 1 | 7 | 7 | 1 | 3 | 0 | 45 | 0% |
| Example 11 | 1 | 10 | 1 | 7 | 7 | 1 | 4 | 0 | 46 | 0% |
| Example 12 | 1 | 10 | 1 | 7 | 7 | 1 | 5 | 0 | 48 | 0% |
| Comparative Example 7 | 1 | 10 | 1 | 7 | 7 | 1 | 6 | 0 | 46 | 18% |
| Comparative Example 8 | 1 | 15 | 1 | 7 | 7 | 1 | 1 | 8 | 48 | 0% |
| Example 13 | 1 | 15 | 1 | 7 | 7 | 1 | 2 | 0 | 47 | 0% |
| Example 14 | 1 | 15 | 1 | 7 | 7 | 1 | 3 | 0 | 47 | 0% |

TABLE 1-continued

| | Mn/Ti Peak Intensity Ratio | | Ho/Ti Peak Intensity Ratio | | | Si/Ti Peak Intensity Ratio | | Fracture and Chipping Count N = 100 | MTTF 120° C. 6.3 V | Short-Circuiting Occurrence N = 100 |
|---|---|---|---|---|---|---|---|---|---|---|
| | Effective Portion | End Surface Outer Layer Portion | Effective Portion | End Surface Outer Layer Portion | Side Surface Outer Layer Portion | Effective Portion | Side Surface Outer Layer Portion | | | |
| Example 15 | 1 | 15 | 1 | 7 | 7 | 1 | 4 | 0 | 46 | 0% |
| Example 16 | 1 | 15 | 1 | 7 | 7 | 1 | 5 | 0 | 48 | 0% |
| Comparative Example 9 | 1 | 15 | 1 | 7 | 7 | 1 | 6 | 0 | 50 | 17% |
| Comparative Example 10 | 1 | 20 | 1 | 10 | 10 | 1 | 1 | 7 | 49 | 0% |
| Comparative Example 11 | 1 | 20 | 1 | 10 | 10 | 1 | 2 | 5 | 47 | 0% |
| Comparative Example 12 | 1 | 20 | 1 | 10 | 10 | 1 | 3 | 4 | 48 | 0% |
| Comparative Example 13 | 1 | 20 | 1 | 10 | 10 | 1 | 4 | 3 | 47 | 0% |
| Comparative Example 14 | 1 | 20 | 1 | 10 | 10 | 1 | 5 | 2 | 46 | 0% |
| Comparative Example 15 | 1 | 20 | 1 | 10 | 10 | 1 | 6 | 5 | 46 | 15% |

The peak intensity ratio in Table 1 was specifically found by a method which will be described below.

Initially, multilayer ceramic capacitor 10 was cut along width direction W and layering direction T in the central portion in length direction L (see FIGS. 2, 4, and 5) to expose the cross-section of effective portion 20. Then, a region of a field of view of 15 μm×15 μm at the center of the exposed cross-section, that is, central portion G in FIG. 2, was analyzed for Ti, Mn, and a rare earth element (Ho) by laser ICP and the peak intensity ratio thereof was calculated.

As described above, in connection with relation between Si and Ti, in consideration of the fact that Si is a light element and accuracy is low in measurement by laser ICP, peak intensity of Si was examined by TEM-EDX and peak intensity of Ti a ratio to which was to be calculated was also examined by TEM-EDX.

Peak intensity of each component in the dielectric ceramic layer in the side surface outer layer portion and the end surface outer layer portion was measured in the side surface outer layer portion and the end surface outer layer portion, at the surface exposed by cutting along width direction W and layering direction T at central portion G (see FIGS. 2, 4, and 5) in length direction L, as in measurement of peak intensity in effective portion 20.

Numeric values of the Mn/Ti peak intensity ratio and the Ho/Ti peak intensity ratio at each site in the effective portion, the side surface outer layer portion, and the end surface outer layer portion in Table 1 are not values as they are of the Mn/Ti peak intensity ratio and the Ho/Ti peak intensity ratio but values given by standardizing the Mn/Ti peak intensity ratio and the Ho/Ti peak intensity ratio at each site with the Mn/Ti peak intensity ratio and the Ho/Ti peak intensity ratio in the effective portion each being defined as 1.

The Si/Ti peak intensity ratio in the effective portion and the Si/Ti peak intensity ratio in the side surface outer layer portion in Table 1 are not expressed as the values as they are of the Si/Ti peak intensity ratio found by TEM-EDX, but are expressed as values given by standardizing the Si/Ti peak intensity ratio in the side surface outer layer portion with the Si/Ti peak intensity ratio in the effective portion being defined as 1.

In the present embodiment, for the multilayer ceramic capacitors representing Examples meeting the requirements in the present invention and the multilayer ceramic capacitors representing Comparative Examples not meeting the requirements in the present invention, a state of occurrence of fracture and chipping (count), mean time to failure (MTTF) which is an indicator for determination as to high-temperature load reliability, and short-circuiting occurrence were examined. Table 1 also shows results thereof.

Fracture and chipping refers to an externally recognizable defect (an apparent structural defect) having a maximum diameter not smaller than 50 μm. Table 1 shows the number of samples among one hundred samples in which occurrence of a defect having a maximum diameter not smaller than 50 μm was observed as a result of visual inspection.

Mean time to failure (MTTF) which is an indicator for determination as to high-temperature load reliability is expressed as an average value of times until occurrence of failure such as short-circuiting or deterioration of insulating resistance by application of a voltage of 6.3 V to thirty samples in a high-temperature atmosphere at 120° C. When the mean time to failure (MTTF) is shorter than a prescribed time period, high-temperature load reliability is determined as "not good" (see Table 1).

For example, when the dielectric ceramic layer is designed to have a thickness of 0.5 μm, the prescribed time period is set to twenty-five hours, and when the dielectric ceramic layer is designed to have a thickness of 0.4 μm, the prescribed time period is set to twenty hours. Since the dielectric ceramic layer has the thickness of approximately 0.5 μm in the present embodiment, high-temperature load reliability is evaluated as "not good" when the MTTF is shorter than twenty-three hours. Among the samples in Examples meeting the requirements in the present invention, there was no sample MTTF of which was shorter than twenty-three hours and no sample was evaluated as "not good."

The short-circuiting occurrence in Table 1 represents a result of examination of a state of occurrence of short-circuiting in the sample in each of Examples and Comparative Examples made in the present embodiment, in a stage prior to a test for examining high-temperature load reliability (MTTF).

In the present embodiment, the sample in which occurrence of short-circuiting was not observed in the test for examining the short-circuiting occurrence was subjected to a high-temperature load reliability test for measuring the mean time to failure (MTTF) described above.

As shown in Table 1, fracture and chipping or occurrence of a short-circuiting defect was observed in the multilayer ceramic capacitors in Comparative Examples 1 to 15 not meeting the characteristic requirements in the present invention, whereas fracture and chipping or occurrence of a short-circuiting defect was not observed in the multilayer ceramic capacitors according to the present embodiment.

It can be seen from this result that a multilayer ceramic capacitor less likely to suffer from fracture and chipping and high in high-temperature load reliability can be obtained by meeting such requirements that the Mn/Ti peak intensity ratio (the peak intensity ratio found by laser ICP) in the dielectric ceramic layer in the end surface outer layer portion is within a range not lower than two times and not higher than fifteen times as high as the Mn/Ti peak intensity ratio in the dielectric ceramic layer in the central portion in the effective portion, the rare earth element/Ti peak intensity ratio in the dielectric ceramic layer in the end surface outer layer portion is within a range not lower than two times and not higher than seven times as large as the value of the rare earth element/Ti peak intensity ratio in the dielectric ceramic layer in the central portion in the effective portion, the Si/Ti peak intensity ratio (the peak intensity ratio found by TEM-EDX) in the dielectric ceramic layer in the side surface outer layer portion is within a range not lower than two times and not higher than five times as high as the Si/Ti peak intensity ratio (the peak intensity ratio found by TEM-EDX) in the dielectric ceramic layer in the central portion in the effective portion, and the rare earth element/Ti peak intensity ratio (the peak intensity ratio found by laser ICP) in the dielectric ceramic layer in the side surface outer layer portion is within a range not lower than two times and not higher than seven times as high as the rare earth element/Ti peak intensity ratio in the dielectric ceramic layer in the central portion in the effective portion.

Though a reason why the multilayer ceramic capacitor according to the embodiment of the present invention is less likely to suffer from fracture or chipping and achieves improved high-temperature load reliability is not necessarily clear, the reason may be that (a) diffusion of Mn is accelerated so that a ratio of Mn at an end in the length direction of the internal electrode increases, growth of grains of ceramics that forms the dielectric ceramic layer is suppressed to improve smoothness of an element, and consequently high-temperature load reliability is improved and (b) growth of grains of ceramics that forms the dielectric ceramic layer is suppressed and a particle size becomes small to increase grain boundaries, so that external impact is more likely to be absorbed, occurrence of fracture or chipping is less, and occurrence of a structural defect is less.

In the embodiment, since the dielectric ceramic layer is composed of ceramics mainly composed of $BaTiO_3$, a content of Ti in the dielectric ceramic layer is approximately 20 mol %. In an example where Ti is contained at such a ratio, functions and effects of the present invention can be obtained by containing Mn, a rare earth element, and Si at a prescribed site such that the Mn/Ti peak intensity ratio, the rare earth element/Ti peak intensity ratio, and the Si/Ti peak intensity ratio as described above are achieved.

Figure 10A:
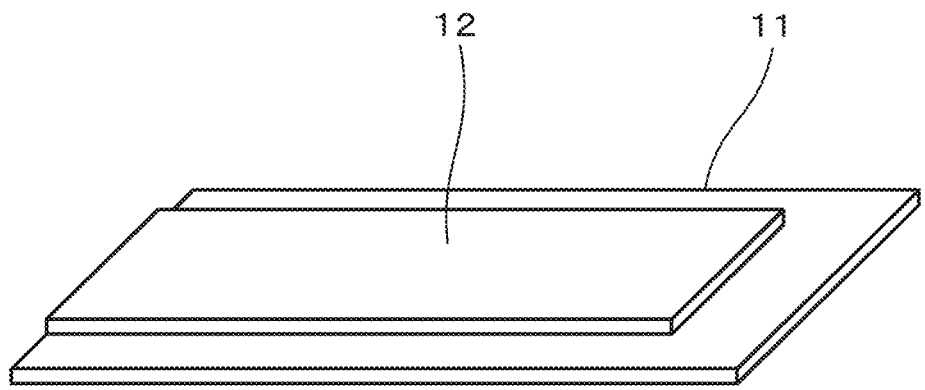
FIG. 10A is a diagram of a state before formation of the ceramic paste layer in the method of making a zero-height-difference sheet in a modification.
Figure 10B:
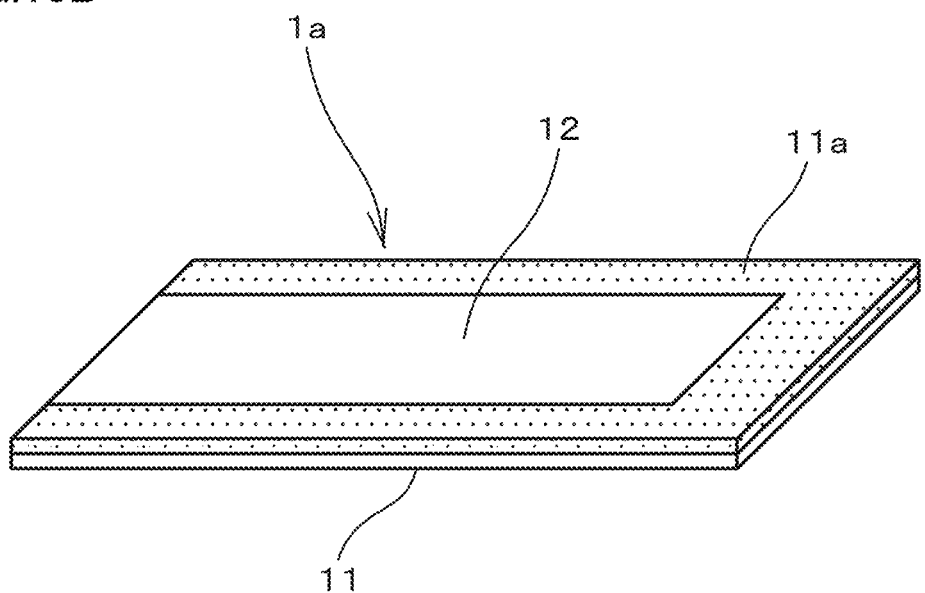
FIG. 10B is a diagram of a state after formation of the ceramic paste layer in the method of making a zero-height-difference sheet in the modification.

In the embodiment, as shown in FIG. 6B, a ceramic green sheet, that is, zero-height-difference sheet, 1a, with no height difference between the region where internal electrode pattern 12 is formed and the region where no internal electrode pattern 12 is formed as a result of formation of ceramic paste layer 11a in a region where no internal electrode pattern 12 is formed, that is, in a region on one end side in the longitudinal direction of ceramic green sheet 11, is employed as zero-height-difference sheet 1a. For example, however, zero-height-difference sheet 1a with no height difference between the region where internal electrode pattern 12 is formed and a region therearound where no internal electrode pattern 12 is formed as a result of arrangement of ceramic paste layer 11a around internal electrode pattern 12 formed on the surface of ceramic green sheet 11 as shown in FIG. 10B in such a manner that only one side is drawn to the end of ceramic green sheet 11 as shown in FIG. 10A can also be employed. When zero-height-difference sheet 1a shown in FIG. 10B is employed, no internal electrode pattern is exposed at the side surface of the obtained multilayer body and hence a ceramic sheet for covering does not have to be bonded to the side surface of the multilayer body.

In employing zero-height-difference sheet 1a shown in FIG. 10B as well, what is called a multi-production method of forming a mother multilayer body from a mother green sheet where a large number of internal electrode patterns are formed in matrix and cutting the mother multilayer body at prescribed positions to divide the mother multilayer body into individual multilayer bodies can be applied. In this case, since no internal electrode pattern is exposed at the side surface of the obtained individual multilayer body, a ceramic sheet does not have to be bonded to the side surface of the multilayer body as described above.

The present invention may be able to achieve suppression of occurrence of fracture or chipping and improvement in high-temperature load reliability also when it is applied to a multilayer ceramic capacitor manufactured from a ceramic green sheet with a height difference between the region where the internal electrode pattern is formed and the region where no internal electrode pattern is formed, that is, a ceramic green sheet where no ceramic paste layer for eliminating a height difference is provided, without being limited to the multilayer ceramic capacitor including what is called a zero-height-difference sheet described above.

A dimension of each portion of the multilayer ceramic capacitor preferred for application of the present invention will now be described.

For example, preferred dimensions of the multilayer ceramic capacitor are exemplified below.

<Dimension of Each Portion of Multilayer Ceramic Capacitor>

(Type 1)

Dimension in length direction L: not smaller than 0.32 mm and not larger than 0.36 mm Dimension in width direction W: not smaller than 0.25 mm and not larger than 0.30 mm Dimension in layering direction T: not smaller than 0.25 mm and not larger than 0.30 mm Thickness of dielectric ceramic layer: not smaller than 0.35 μm and not larger than 0.6 μm Thickness of internal electrode layer: not smaller than 0.2 μm and not larger than 0.4 μm The thickness of the dielectric ceramic layer and the internal electrode layer is an average thickness of the dielectric ceramic layers and the internal electrode layers in the effective portion.

(Type 2)

Dimension in length direction L: not smaller than 0.1 mm and not larger than 0.12 mm Dimension in width direction W: not smaller than 0.63 mm and not larger than 0.68 mm Dimension in layering direction T: not smaller than 0.62 mm and not larger than 0.68 mm Thickness of dielectric ceramic layer: not smaller than 0.35 μm and not larger than 0.6 μm Thickness of internal electrode layer: not smaller than 0.2 μm and not larger than 0.4 μm.

The thickness of the dielectric ceramic layer and the internal electrode layer is an average thickness of the dielectric ceramic layers and the internal electrode layers in the effective portion.

In the multilayer ceramic capacitor according to the present invention, regardless of its outer dimension, the internal electrode layer has a thickness preferably not larger than 0.4 µm and more preferably not larger than 0.3 µm.

By having the thickness of the internal electrode layer at 0.4 µm or smaller, the layer can be smaller in thickness, a capacitance can be higher, and peel-off due to difference in shrinkage between the internal electrode and the dielectric layer can be prevented.

By having the thickness of the internal electrode layer at 0.3 µm or smaller, peel-off can more reliably be prevented. From a point of view of ensuring coverage of the internal electrode layer, the thickness is normally desirably not smaller than 0.2 µm.

In the multilayer ceramic capacitor according to the present invention, the dielectric ceramic layer has a thickness preferably not larger than 0.6 µm. By setting the thickness of the dielectric ceramic layer to 0.6 µm or smaller, the multilayer ceramic capacitor high in capacitance can be obtained.

From a point of view of preventing short-circuiting between the internal electrode layers or lowering in high-temperature load reliability, the dielectric ceramic layer normally has a thickness preferably not smaller than 0.1 µm.

<Method of Measuring Thickness of Dielectric Ceramic Layer and Internal Electrode Layer>

A method of measuring a thickness of the dielectric ceramic layer and the internal electrode layer will now be described.

Figure 11:
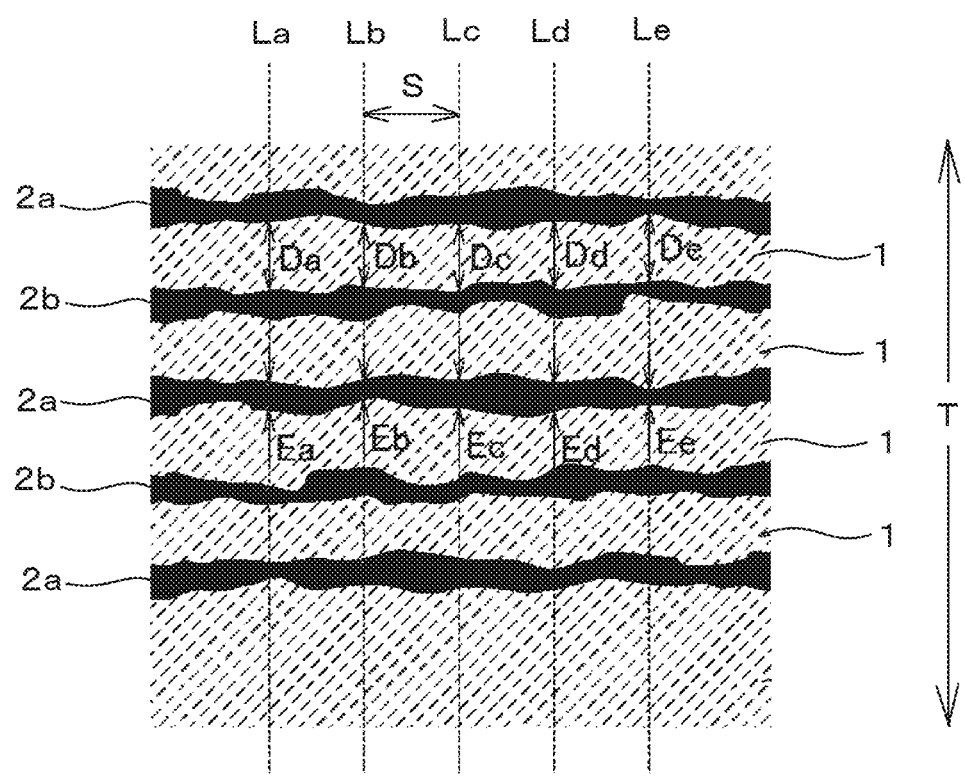
FIG. 11 is a diagram illustrating a method of measuring a thickness of a dielectric ceramic layer and an internal electrode layer.

For example, in measuring a thickness of the dielectric ceramic layer, as shown in FIG. 11, a plurality of straight lines La, Lb, Lc, and Ld, and a straight line Le are drawn at prescribed intervals S, a thickness Da on straight line La, a thickness Db on straight line Lb, a thickness Dc on straight line Lc, a thickness Dd on straight line Ld, and a thickness De on straight line Le are measured, and an average value thereof is defined as the thickness of the dielectric ceramic layer.

Similarly, in measuring a thickness of the internal electrode layer, as shown in FIG. 11, a thickness Ea on straight line La, a thickness Eb on straight line Lb, a thickness Ec on straight line Lc, a thickness Ed on straight line Ld, and a thickness Ee on straight line Le are measured, and an average value thereof is defined as the thickness of the internal electrode layer.

For example, in calculating an average thickness of a plurality of dielectric ceramic layers, the thickness is measured with the method above for each of five dielectric ceramic layers inclusive of the dielectric ceramic layer located substantially in the center in layering direction T and two dielectric ceramic layers located on each of opposing sides thereof, and an average value thereof is defined as the average thickness of the plurality of dielectric ceramic layers. In calculating an average thickness of a plurality of internal electrode layers, the thickness is measured with the method above for each of five internal electrode layers inclusive of the internal electrode layer located substantially in the center in layering direction T and two internal electrode layers located on each of opposing sides thereof, and an average value thereof is defined as the average thickness of the plurality of internal electrode layers. When the number of layered dielectric ceramic layers (internal electrode layers) is smaller than five, the thicknesses of all dielectric ceramic layers and internal electrode layers are measured with the method above and an average value thereof is defined as the average thickness of the plurality of dielectric ceramic layers and the internal electrode layers.

<Method of Measuring Common Material in External Electrode>

A content, that is, an area ratio, of a ceramic material which is a common material in the first Ni layer which is the underlying electrode layer is measured with a method below with the use of a wavelength dispersive X-ray spectroscope (WDX). Initially, a cross-section of a central area in width direction W of multilayer ceramic capacitor 10 is exposed and a central area in a thickness dimension of the first Ni layer which is the underlying electrode layer in a central area in layering direction T of multilayer body 3 is magnified at 10000×. A field of view of the magnified area is set to 6 µm×8 µm. The magnified area is mapped by WDX and the area ratio (area %) in an image obtained by mapping is measured.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A multilayer ceramic capacitor comprising:
   a multilayer body including a plurality of dielectric ceramic layers and a plurality of internal electrode layers that are alternately layered,
   the plurality of dielectric ceramic layers containing Ba, Ti, Mn, a rare earth element, and Si,
   the multilayer body defining:
      a first main surface and a second main surface opposed to each other in a direction of layering of the plurality of dielectric ceramic layers and the plurality of internal electrode layers,
      a first side surface and a second side surface opposed to each other in a width direction, the width direction being a direction orthogonal to both of the direction of layering and a direction of drawing of the plurality of internal electrode layers to a surface of the multilayer body, and
      a first end surface and a second end surface opposed to each other in a length direction, the length direction being a direction orthogonal to both of the direction of layering and the width direction;
   a first external electrode on the first end surface and electrically connected to a first set of internal electrode layers of the plurality of internal electrode layers; and
   a second external electrode on the second end surface and electrically connected to a second set of internal electrode layers of the plurality of internal electrode layers, wherein
   a region where the internal electrode layers are layered on one another when viewed in the direction of layering is defined as an effective portion,
   regions between which the effective portion lies in the direction of layering each are a main surface outer layer portion,
   regions between which the effective portion lies in the width direction each are a side surface outer layer portion,
   regions between which the effective portion lies in the length direction each are an end surface outer layer portion, a value of an end surface outer layer Mn/Ti peak intensity ratio, which is a ratio of a peak intensity of Mn found by laser ICP to a peak intensity of Ti found by laser ICP in the dielectric ceramic layer in the end surface outer layer portion, is within a range of not lower than two times and not higher than fifteen times as large as a value of a central portion Mn/Ti peak intensity ratio, which is a ratio of a peak intensity of Mn found by laser ICP to a peak intensity of Ti found by laser ICP in the dielectric ceramic layer in a central portion in the width direction, the length direction, and the direction of layering in the effective portion, a value of an end surface outer layer rare earth element/Ti peak intensity ratio, which is a ratio of a peak intensity of a rare earth element found by laser ICP to a peak intensity of Ti found by laser ICP in the dielectric ceramic layer in the end surface outer layer portion is within a range of not lower than two times and not higher than seven times as large as a value of a central portion rare earth element/Ti peak intensity ratio, which is a ratio of a peak intensity of the rare earth element found by laser ICP to the peak intensity of the Ti found by laser ICP in the dielectric ceramic layer in the central portion, a value of a side surface outer layer Si/Ti peak intensity ratio, which is a ratio of a peak intensity of Si found by TEM-EDX to a peak intensity of Ti found by TEM-EDX in the dielectric ceramic layer in the side surface outer layer portion is within a range of not lower than two times and not higher than five times as large as a value of a central portion Si/Ti peak intensity ratio, which is a ratio of a peak intensity of Si found by TEM-EDX to a peak intensity of Ti found by TEM-EDX in the dielectric ceramic layer in the central portion in the effective portion, and a value of a side surface rare earth element/Ti peak intensity ratio, which is a ratio of a peak intensity of the rare earth element found by laser ICP to a peak intensity of Ti found by laser ICP in the dielectric ceramic layer in the side surface outer layer portion is within a range of not lower than two times and not higher than seven times as large as a value of the central portion rare earth element/Ti peak intensity ratio.

2. The multilayer ceramic capacitor according to claim 1, wherein the first and second external electrodes include:

a first Ni layer on the first end surface and the second end surface of the multilayer body, respectively, a second Ni layer on the first Ni layer, and an Sn layer on the second Ni layer.

3. The multilayer ceramic capacitor according to claim 1, wherein the internal electrode layer has a thickness not larger than 0.4 μm.

4. The multilayer ceramic capacitor according to claim 1, wherein the internal electrode layer has a thickness not larger than 0.3 μm.

5. The multilayer ceramic capacitor according to claim 3, wherein the dielectric ceramic layer has a thickness not larger than 0.6 μm.

6. The multilayer ceramic capacitor according to claim 4, wherein the dielectric ceramic layer has a thickness not larger than 0.6 μm.

7. The multilayer ceramic capacitor according to claim 1, wherein the dielectric ceramic layer has a thickness not larger than 0.6 μm.

8. The multilayer ceramic capacitor according to claim 1, wherein the external electrode contains a dielectric composition of the plurality of dielectric ceramic layers at a ratio not lower than 25 area % and not higher than 40 area %.

9. The multilayer ceramic capacitor according to claim 1, wherein the rare earth element is selected from Ho, Dy, and Y.

* * * * *